United States Patent [19]

Kawamura

[11] Patent Number: 4,769,993
[45] Date of Patent: Sep. 13, 1988

[54] TURBOCHARGER FOR INTERNAL COMBUSTION ENGINES

[75] Inventor: Hideo Kawamura, Kanagawa, Japan

[73] Assignee: Isuzu Motors Limited, Tokyo, Japan

[21] Appl. No.: 139,099

[22] Filed: Dec. 24, 1987

Related U.S. Application Data

[63] Continuation of Ser. No. 18,861, Feb. 25, 1987, abandoned, which is a continuation of Ser. No. 712,611, Mar. 18, 1985, abandoned.

[30] Foreign Application Priority Data

Mar. 17, 1984 [JP] Japan ................................ 59-51559
Mar. 17, 1984 [JP] Japan ................................ 59-51562

[51] Int. Cl.$^4$ ...................... F02B 37/00; F01D 15/10
[52] U.S. Cl. ......................................... 60/597; 60/607;
60/608; 290/52; 310/156
[58] Field of Search ................ 60/602, 605, 624, 597,
60/608, 607; 310/156, 168, 68 R, 102 R, DIG.
3, 113; 290/52; 415/176, 212 R, 214; 363/37;
322/20, 39, 89

[56] References Cited

U.S. PATENT DOCUMENTS

| 3,031,607 | 4/1962 | Rona | 322/20 |
| 3,369,170 | 2/1968 | Custer | 322/89 |
| 4,067,101 | 1/1978 | Ono | 29/598 |
| 4,253,031 | 2/1981 | Frister | 417/407 |

FOREIGN PATENT DOCUMENTS

| 0079100 | 5/1983 | European Pat. Off. | 60/608 |
| 2206450 | 8/1973 | Fed. Rep. of Germany . | |
| 2808147 | 8/1979 | Fed. Rep. of Germany | 60/608 |
| 2941240 | 4/1981 | Fed. Rep. of Germany | 60/597 |
| 2951136 | 6/1981 | Fed. Rep. of Germany | 60/607 |
| 2072611 | 9/1971 | France . | |
| 2183337 | 12/1973 | France . | |
| 399520 | 10/1933 | United Kingdom | 60/607 |
| 2117188 | 10/1983 | United Kingdom . | |

Primary Examiner—Douglas Hart
Attorney, Agent, or Firm—Staas & Halsey

[57] ABSTRACT

A turbocharger for an internal combustion engine is disclosed, including a turbine drivable by the exhaust energy of the internal combustion engine, and an air compressor coupled by a shaft to an impeller of the turbine for charging air into engine cylinders in response to rotation of the shaft. A rotor is mounted on the shaft and stator cores and coils are disposed around the rotor. The rotor and the stator cores and coils jointly constitute a motor-generator which operates as a motor or a generator dependent on operating conditions of the internal combustion engine.

8 Claims, 4 Drawing Sheets

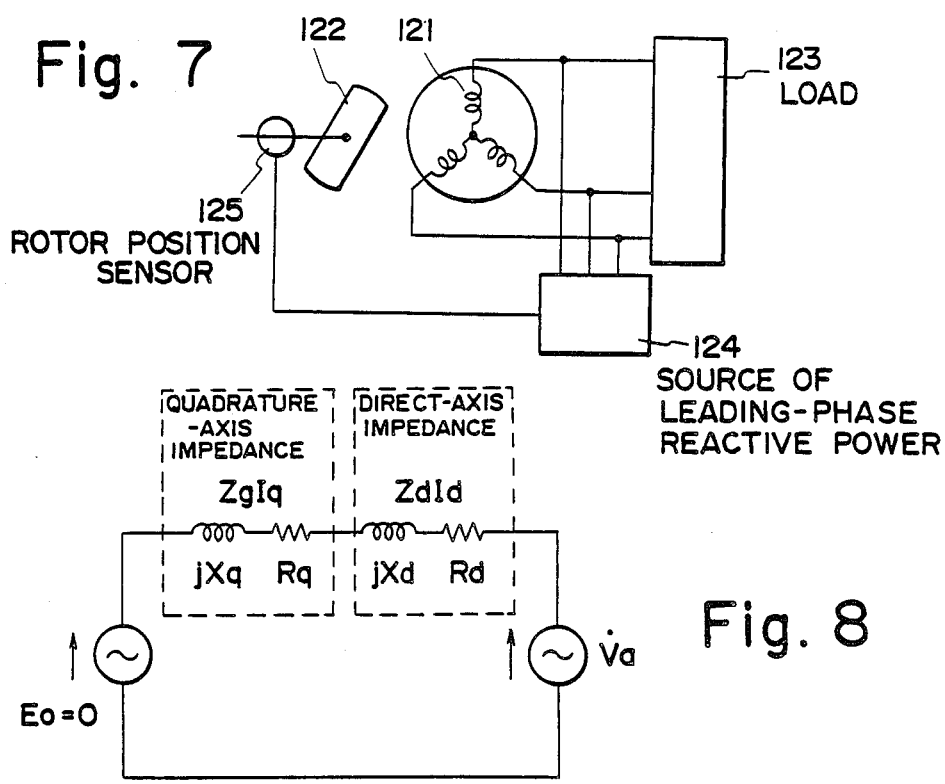
Fig. 7
Fig. 8
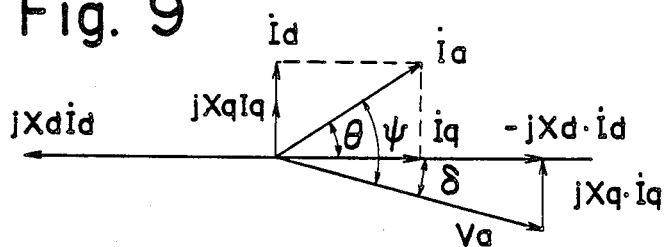
Fig. 9
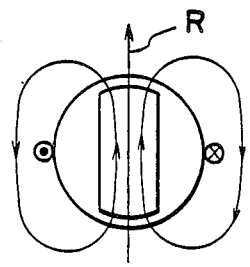 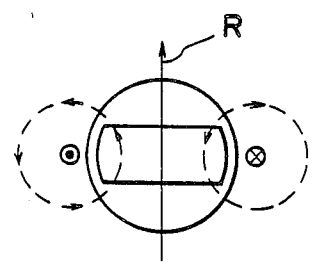
Fig. 10a   Fig. 10b

TURBOCHARGER FOR INTERNAL COMBUSTION ENGINES

This is a continuation of co-pending application Ser. No. 018,861 filed on Feb. 25, 1987 which is a continuation of application Ser. No. 712,611, filed on Mar. 18, 1985, both now abandoned.

BACKGROUND OF THE INVENTION

The present invention relates to a turbocharger for an internal combustion engine and, more particularly, to a motor-generator used with the turbocharger.

The output of an internal combustion engine is produced by combusting a mixture of fuel and air. To increase the engine output, it is necessary to introduce as much air as possible into the engine cylinders.

To meet the above requirement, internal combustion engines of today are equipped with a turbocharger having a turbine driven by the energy of an exhaust gas and an air compressor operatively coupled or integrally joined to the turbine. The air compressor is rotated by the turbine to charge a more-than-normal amount of air into the engine cylinders to burn the fuel efficiently. Therefore, the turbocharged internal combustion engine has an increased charging efficiency to produce a high output and a high torque while simultaneously achieving improved fuel consumption.

Although the conventional turbochargers can produce a large torque increase in medium and high speeds of rotation of the engine, the exhaust energy which tends to be excessive in high-speed and low-load engine conditions has to be discharged into the atmosphere. Under low-speed and high-load engine conditions, no sufficient exhaust energy is obtained and, hence, no sufficient air can be charged into the engine cylinders, with the result that the torque rises only slightly and no large freedom of selection of transmission gears is available. Therefore, the possibility of replacing large-size internal combustion engines with small-size turbocharged internal combustion engines is small though there is some improvement in the engine output. Where a small-size internal combustion engine is turbocharged for a greater engine output, it would be advantageous if the engine output could be increased without increasing the number of transmission gears by reducing a final gear ratio or increasing the mechanical strength of each gear. However, since the engine torque is low in low-speed engine rotation, the desired performance for the automobile to climp up a slope could not be achieved unless the transmission were altered to a large extent.

It has been proposed that the turbocharger be assisted by a generator in low-speed engine rotation, thereby increasing the air charging efficiency at the low engine speed. With this proposal, however, it is necessary to attach heavy windings, pole pieces, or permanent magnets to the driven component, thus increasing the rotational inertia thereof. As a consequence, the turbocharger will not function sufficiently.

SUMMARY OF THE INVENTION

It is an object of the present invention to provide a turbocharger for an internal combustion engine, which has a motor-generator that can operate as either a motor or a generator dependent on the operating conditions of the internal combustion engine.

Another object of the present invention is to provide a turbocharger for an internal combustion engine, which assists the operation of an air compressor when the engine rotates in a low-speed range and converts an excessive energy of the exhaust gas into a recoverable electric power in a medium- and high-speed range of engine rotation.

Still another object of the present invention is to provide a turbocharger for an internal combustion engine, which has a motor-generator that is compact and lightweight.

According to the present invention, there is provided a turbocharger for an internal combustion engine, including: a turbine drivable by the exhaust energy of the internal combustion engine; an air compressor coupled by a shaft to an impeller of the turbine for charging air into the engine cylinders in response to rotation of the shaft; and a motor-generator composed of a rotor mounted on the staft and stator coils disposed around the rotor, the motor-generator being operable as a motor or a generator dependent upon the operating conditions of the internal combustion engine.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a circuit diagram of a control circuit for the reluctance generator;

FIG. 8 is an equivalent circuit diagrammatic view of the reluctance generator;

FIG. 9 is a diagrammatic view explanatory of the voltage and current vectors in the equivalent circuit of the reluctance generator; and FIGS. 10a and 10b are diagrammatic view showing the relationship between angular positions of a rotor and a winding axis.

DETAILED DESCRIPTION OF THE PREFERRED EMBODIMENTS

Figure 1:
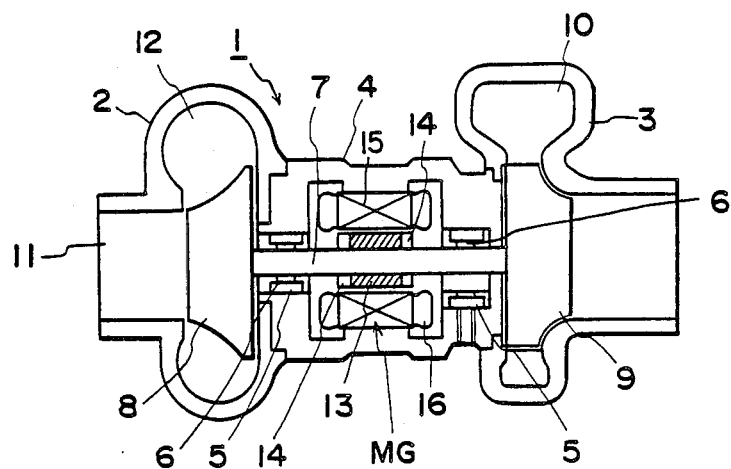
FIG. 1 is a longitudinal cross-sectional view of a turbocharger according to the present invention.

FIG. 1 shows a turbocharger 1 of the inventior in longitudinal cross section. The turbocharger 1 includes a compressor housing 2, a turbine housing 3, and a central housing 4. The central housing 4 accommodates in its opposite ends fixed bearings 5 and floating bearings 6 slidably rotatable in the fixed bearings 5, respectively. A shaft 7 is rotatably supported at its opposite ends in the floating bearings 6.

To the ends of the shaft 7, there are attached an air compressor impeller 8 and a turbine impeller 9 which are disposed in the compressor housing 2 and the turbine housing 3, respectively. The tubine impeller 9 is rotated by the energy of an exhaust gas supplied into a scroll 10. The compressor impeller 8 serves to effect pressure conversion, in a diffuser 12, of air introduced from an air inlet 11, and feed the air into the engine cylinders (not shown).

A ring-shaped magnetic rotor 13 which is elongate in the axial direction is mounted centrally on the shaft 7. The magnetic rotor 13 is composed of a rare-earth magnet generating an extremely strong magnetic force. Since the rare-earth magnet is extremely low in deflective strength and tensile strength, the end faces thereof are held by disks 14 of a metal of high tensile strength, such as titanium or very strong aluminum. The magnetic rotor 13 is wound by carbon fibers surrounding the outer periphery thereof. Therefore, the magnetic rotor 13 is rigid and durable against centrifugal forces and vibrations applied thereto.

Stator cores 15 and stator coils 16 are disposed in the central housing 4 around the magnetic rotor 13 in radially confronting relation thereto for inducing an alternating voltage upon rotation of the magnetic rotor 13. The magnetic rotor 13, the stator cores 15, and the stator coils 16 jointly constitute a motor-generator MG.

Figure 2:
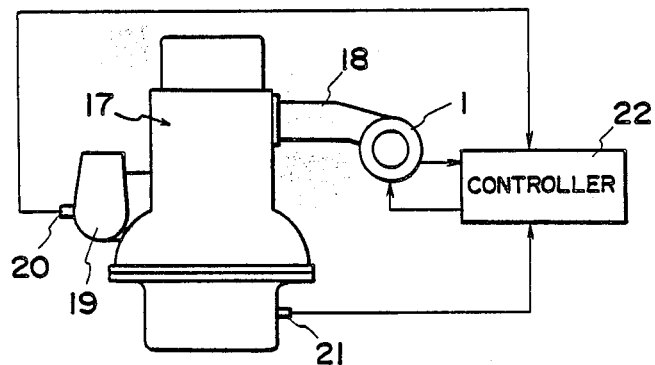
FIG. 2 is a schematic diagram view showing the relationship between an internal combustion engine equipped with the turbocharger of the invention and a controller.

FIG. 2 illustrates the relationship between an internal combustion engine 17 equipped with the turbocharger 1 and a controller 22. An exhaust manifold 18 is connected to an exhaust port of the internal combustion engine 17, and the scroll 10 of the turbocharger 1 is coupled to the exhaust manifold 18. A fuel injection pump 19 is mounted on the body of the internal combustion engine 17, and is combined with a load sensor 20 for detecting the amount of fuel injected, i.e., the magnitude of the load.

The internal combustion engine 17 has a crankcase on which is mounted a rotation sensor 21 for detecting the rpm of the engine, i.e., the rpm of the crankcase.

The outputs of the sensors 20, 21 are supplied to the controller 22 for controlling the motor-generator MG to operate as a motor or a generator. When the internal combustion engine 17 rotates at a low speed or is subjected to a large load, the motor-generator MG operates as a motor to rotate the magnetic rotor 13 and hence the turbine impeller 9 for an increased air charging efficiency. When the internal combustion engine 17 rotates at a high speed or is subjected to a small load in low-speed rotation, the motor-generator MG operates as a generator to supply electric power to external loads while allowing the turbocharger 1 to charge air into the engine cylinders.

Operation of the turbocharger 1 is as follows: When the internal combustion engine 17 is started, a high-temperature, high-pressure exhaust gas discharged from the engine 17 through the exhaust manifold 18 into the scroll 10 rotates the turbine impeller 9. At the same time, the compressor impeller 8 is rotated to supply compressed air through the diffuser 12 into the engine cylinders. The combustion efficiency of the engine is thus improved to achieve an increased torque and output.

When the engine 17 rotates in a low speed range at the time it is started or immediately after it has been started, no sufficient exhaust gas energy is supplied to the turbine impeller 9 and, hence, the amount of air charged by the compressor impeller 8 is small. As a result, the torque and output are not increased. Such engine operating conditions are detected by the load sensor 20 and the rotation sensor 21, and the controller 22 is responsive to the detected signals from the load sensor 20 and the rotation sensor 21 for supplying electric power to the motor-generator MG which now operates as a motor.

Therefore, the shaft 7 coupled to the magnetic rotor 13 is provided with a combination of the torque generated by the motor and the torque imposed by the exhaust gas energy on the turbine impeller 9, thereby rotating the compressor impeller 8 at a high speed and high torque.

Accordingly, the engine 17 even when it rotates in the low-speed range can produce a large torque and output by means of the turbocharger 1 assisted by the motor torque, and can power the automobile to start with sufficient acceleration and to climb up slopes with good performance.

When the speed of rotation of the internal combustion engine 17 is progressively increased to increase the exhaust energy, the turbine impeller 9 and the shaft 7 are caused to rotate at a speed higher than the speed of rotation of the motor-generator MG operating in the motor mode. The motor-generator MG then operates as a generator to induce a voltage in the stator coils 16, which is fed back to the power supply. The regenerated voltage can be utilized for charging the battery, for example. As a consequence, the generator conventionally employed on the automobile may be dispensed with or may be of a smaller capacity, rendered compact in size and reduced in cost.

Since the magnetic rotor 13 is constructed of a rare-earth magnet, the generator can be small in size while producing sufficient power without increasing the rotational inertia of the turbocharger 1.

With the turbocharger according to the present invention, as described above, the operation of the compressor is assisted by the motor mode of the motor-generator MG so that the charging pressure in the low-speed range of the internal combustion engine will be increased to increase the low-speed torque and provide high-torque engine characteristics. When the engine is in the high-speed range or low-load range, the motor-generator MG operates as a generator to produce electric power supplied to various loads.

FIGS. 3 through 10 illustrate a turbocharger according to another embodiment of the present invention, the turbocharger having a reluctance motor-generator.

Figure 3:
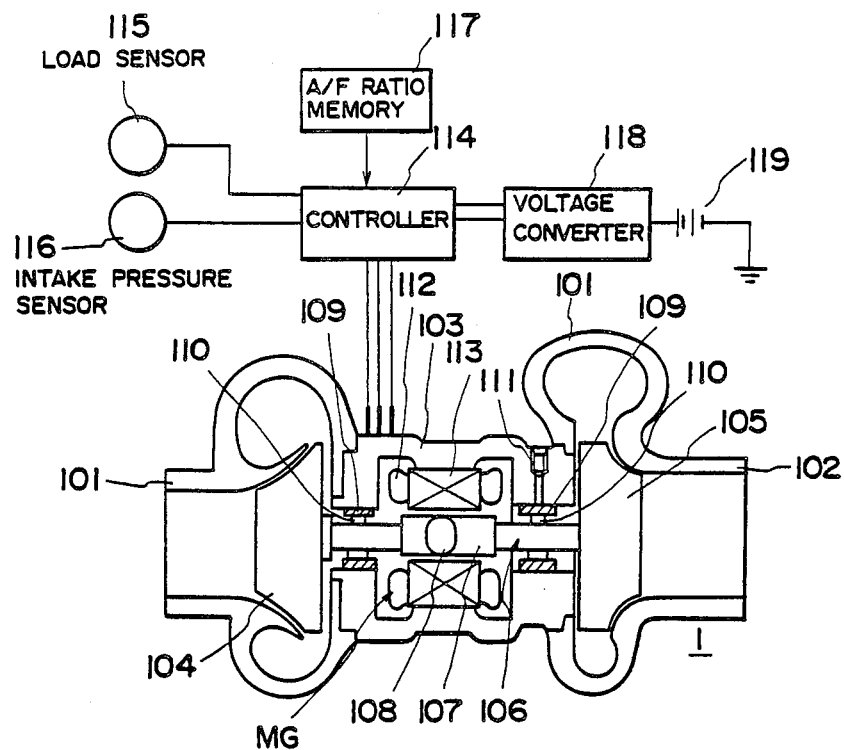
FIG. 3 is a longitudinal cross-sectional view of a turbocharger according to another embodiment of the present invention.

FIG. 3 shows the turbocharger in cross section. The turbocharger 1 includes a compressor housing 101, a turbine housing 102, and a central housing 103, which are coupled together by bolts and nuts, not shown.

A compressor impeller 104 and a tubine impeller 105 are rotatably disposed, respectively, in the compressor housing 101 and the turbine housing 102 and are interconnected by a shaft 106. The shaft 106 is made of low-carbon steel and has portions held in sliding contact with bearings, the sliding contact portions being hardened by high-frequency heating for wear resistance.

Figure 4:
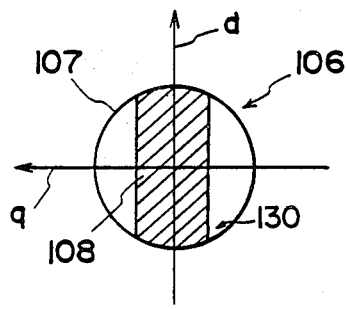
FIG. 4 is a cross-sectional view of a larger-diameter portion of a shaft of the turbocharger, which serves as a rotor.

The shaft 106 has a central larger-diameter portion 107 having a certain axial length and cut off in its diametrically opposite portions to thereby provide a portion 108 of an I-shaped cross section, as shown in FIG. 4. The larger-diameter portion 107 serves as the rotor of a reluctance motor-generator, as described later. Dummy fillers 130 fill the cut off part of the central, larger, diameter portion 107 so that the central, larger, diameter portion 107 has a circular cross-section.

The central housing 103 accommodates in its opposite ends fixed bearings 109 and floating bearings 110 slidably rotatable in the fixed bearings 109, respectively. The shaft 106 is rotatably supported at its opposite ends in the floating bearings 110.

Lubricant oil passages 111 supply lubricating oil to the sliding surfaces between the fixed bearings 109, the floating bearings 110, and the shaft 106.

Stator cores 113 with stator coils 112 mounted thereon are disposed as a ring form in the central portion of the central housing 103 and are positioned in confronting relation to the outer periphery of the larger-diameter portion 107 in the vicinity of the portion 108 of I-shaped cross section. The stator coils 112 are wound around the stator cores 113 as three-phase motor-generator coils.

The portion 108, the stator cores 113, and the stator coils 112 jointly constitute a reluctance motor-generator MG.

A controller 114 is responsive to the magnitude of the load on the engine and the intake air pressure for operating the reluctance motor-generator MG as a motor for assisting the turbocharger or as a generator for generating electric power for use by external loads.

Designated at 115 is a load sensor mounted on a fuel injection pump or the like, 116 an intake air pressure sensor mounted on an intake manifold or the like, and 117 an air/fuel ratio memory for storing appropriate air/fuel ratios for various loads and intake air pressures. The controller 114 computes a suitable air/fuel ratio and supplies a motor driving current to the reluctance motor-generator MG based on the result of computation for assisting the compressor in charging air.

A voltage generated by the motor-generator MG is converted into a DC voltage of a suitable level by a voltage converter 118. The voltage-coverted power charges a battery 119.

When the internal combustion engine rotates at a low speed and high load, as when the automobile starts running or climbs up a slope, the controller 114 is responsive to the output signals from the load sensor 115 and the intake air pressure sensor 116 for supplying a motor driving current to the stator coils 112 of the reluctance motor-generator MG.

The reluctance motor-generator MG now operates as a motor to assist the rotation of the shaft 106 having the larger-diameter portion 107 serving as the rotor, so that the amount of air charged by the compressor impeller 104 into the engine cylinders can be increased. Therefore, the air/fuel ratio is increased to enable the air-fuel mixture to be ignited for powerful explosion resulting in an increased output and torque.

When the internal combustion engine rotates in medium- and high- speed ranges, the turbine impeller 105 rotates at high speeds and the compressor impeller 104 charges a sufficient amount of air into the engine cylinders. At the same time, the larger-diameter portion 107 is driven as a generator rotor to induce a voltage across the stator coils 112, and the induced voltage is converted by the voltage converter 118 for charging the battery 119 or feeding loads, not shown.

The principles of operation of the reluctance motor-generator MG as a generator will be described.

Figure 5A:
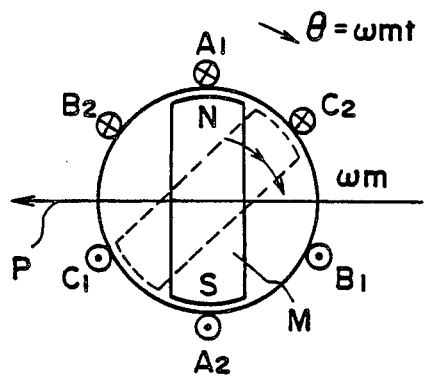
FIGS. 5a and 5b are diagrammatic views illustrative of the principles of a three-phase synchronous generator.
Figure 5B:
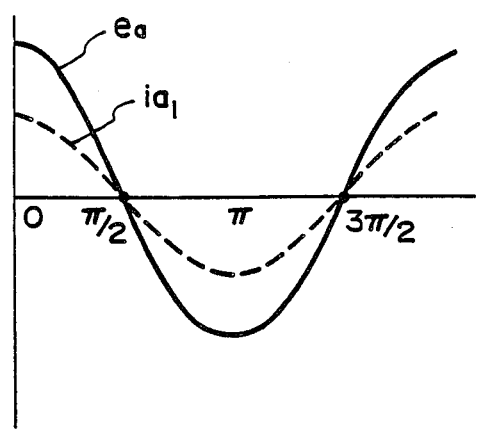

FIGS. 5a and 5b show the principles of a three-phase synchronous generator and the waveshape of an electromotive force induced respectively. An I-shaped rotor M composed of a permanent magnet is rotatable in phase coils $A_1-A_2$, $B_1-B_2$, and $C_1-C_2$. When the rotor M is in the illustrated position, electromotive forces induced in the coils are directed as shown in FIG. 5a, and at this time the electromotive force ea in the coil $A_1-A_2$ is maximum.

When a load is put on the generator and an armature current $ia_1$ flows in phase with the electromotive force ea, the current in an armature winding coincides with the electromotive force distribution shown in FIG. 5b at $\theta = 0$, since the current and voltage in each phase are held in phase with each other. The armature current generates a magnetomotive force across the gap in the direction of the arrow P in FIG. 5a.

Thus, if the electromotive force ea and the armature current $ia_1$ are, in phase with each other, then the magnetomotive force is generated by the armature current and lags a magnetic flux produced by the field coils by a phase angle of 90°.

Therefore, when currents $ia_2$, $ib_2$, $ic_2$ (FIG. 6b) are passed which lead the no-load induced electromotive force ea by 90°, the current $ia_2$ leading the electromotive force ea by 90° flows through the coil $A_1-A_2$, and the magnetomotive force due to the current $ia_2$ falls to zero at $\theta = 0$. However, a magnetomotive force is generated by the currents $ib_2$, $ic_2$ in the direction of the arrow Q (FIG. 6a) which is the same direction as that of the field flux, thereby increasing the field flux.

Figure 6A:
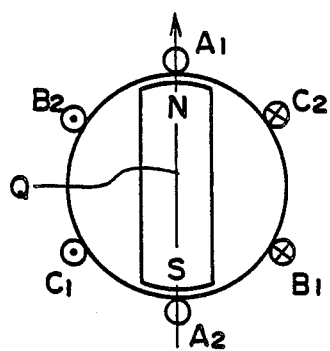
FIGS. 6a and 6b are diagrammatic views illustrative of the principles of a reluctance generator.
Figure 6B:
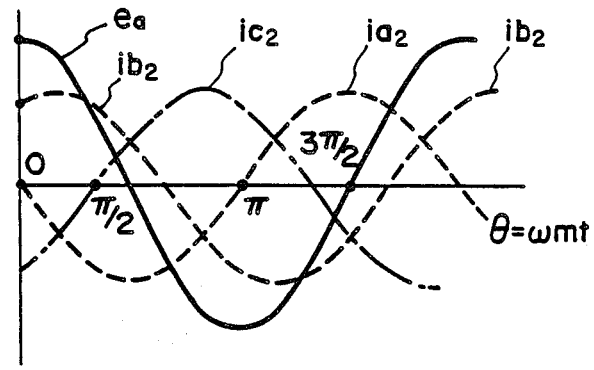

As a result, the process of generating currents leading the no-load induced electromotive force by 90° at all times and continuously changing the magnitudes of the currents is equivalent to an ordinary process of regulating the field current in the synchronous generator, as shown in FIG. 6a. It follows that a generator having the same function as the synchronous generator can be achieved without field coils and a permanent magnet. Such a generator has a reduced power factor as both load and field currents have to be passed through the armature coils.

FIG. 7 shows control circuit for the reluctance generator. Designated at 121 are armature coils of the generator, 122 a rotor, 123 a load, 124 a source of leading-phase reactive power, and 125 a rotor position sensor for detecting the angular position of the rotor 122 at all times and enabling the source 124 to supply excitation currents to the armature coils 121. When the rotor 122 is rotated, electromotive forces are induced in the armature coils 121 to supply electric power to the load 123.

As is apparent from the above principles of operation, the reluctance generator is the same as an ordinary salient-pole synchronous generator from which the field winding has been removed. The reluctance generator has an equivalent circuit as shown in FIG. 8 in which an electromotive force $E_0$ generated by a main flux due to the field winding in the salient-pole generator is zero.

Now, an analysis will be made to determine how the generator output is affected by Xq, Xd where the counterelectromotive force generated by connection to the load 123 is indicated by Va. For simplifying the analysis of operation of the generator, winding resistances Rq, Rd are neglected, and an quadrature-axis impedance Zq is regarded as being equal to jXq while a direct-axis impedance Zd is regarded as being equal to jXd. The vector diagram as shown in FIG. 9 is then plotted.

In FIG. 9, $$Ia \cdot \cos \theta = Iq \tag{1}$$

$$Ia \cdot \sin \theta = Id \tag{2}$$

$$Va \cdot \cos \delta = Xd \cdot Id \quad (3)$$

$$Va \cdot \sin \delta = Xq \cdot Iq \quad (4)$$

One-phase output Pph is given by:

$$\begin{aligned} Pph &= Va \cdot Ia \cdot \cos \psi \\ &= Va \cdot Ia \cdot \cos(\theta + \delta) \end{aligned} \quad (5)$$

By modifying the equation (5), $$Pph = \tfrac{1}{2}(1-\alpha)Xd \cdot Ia^2 \sin 2\theta \quad (6)$$

With $\alpha 32\ Xq/Xd$ and by modifying the equation (6) based on the equations (1) through (4), $$Va = Xd \cdot Ia \sqrt{\sin^2\theta + \alpha^2 \cos^2\theta} \quad (7)$$

The one-phase output Pph then becomes:

$$P_{ph} = \frac{(1-\alpha)\sin^2\theta}{2\sqrt{\sin^2\theta + \alpha^2\cos^2\theta}} Va \cdot Ia = K_1 Va \cdot Ia \quad (8)$$

In order to increase the output Pph, Xd should be increased to as large an extent as possible and Xq should be reduced to as small an extent as possible since Ia is an allowable current for the coils and can be suppressed, in view of the equation (6).

Thus, when the angular position of the rotor coincides with the direction of the coil axis as shown in FIG. 10a, the magnetic flux generated by the coil passes in the direction of the solid-line arrow R, so that the magnetic path has a small magnetic reluctance and the coil has an increased self-inductance $L_1$. When the angular position of the rotor is normal to the coil axis as illustrated in FIG. 10b, the magnetic path has a large magnetic reluctance and the coil has a reduced inductance $L_2$. Therefore, $$Xd = 3/2 \cdot \omega L_1 \quad (9)$$

$$Wq = 3/2 \cdot \omega L_2 \quad (10)$$

As is apparent from the above principles, the portion 108 of I-shaped cross section, the larger-diameter portion 107 of the shaft 106 and the stator coils 112, as shown in FIGS. 3 and 4, constitute the rotor of the reluctance generator. The rotor with a smaller magnetic reluctance in the direction of a d-axis and a larger magnetic reluctance in the direction of a q-axis in the portion 108 can reduce the value $\alpha$ and increase the output Pph.

The reluctance generator can be used as a motor with the larger-diameter portion acting as a rotor by applying voltages to the stator coils 112. The present invention is concerned with a turbocharger having a reluctance motor-generator utilizing such motor-generator characteristics.

With the present invention, as described above, the motor-generator driven by the exhaust-driven turbine operates as a motor to assist the turbine in its rotation when the internal combustion engine rotates in the low-speed range, thus providing a sufficient air charging capability for increasing an engine output and torque.

When the internal combustion engine rotates in the medium- and high-speed ranges or in the low-speed high-load range, the motor-generator operates as a generator for generating electric power to provide a power supply for energizing lamps illuminating indicators, and actuating meters, horns, window wipers, heaters, and ignition.

The reluctance motor-generator shaft connecting the compressor impeller and the turbine impeller is used as the rotor. The shaft is highly suitable for use as the rotor which can withstand high-speed rotation without the danger of getting separated, broken, or vibrated the centrifugal forces applied.

Inasmuch as the diameter of the rotor can be minimized, the turbocharger with the generator can be reduced in size.

Since the reluctance motor-generator employs no field coil and no permanent magnet, the reluctance motor-generator is simple in construction, low in cost, and light in weight.

As no electric power is supplied to or received from the rotor, no brush is employed, and hence the rotor is suitable for high-speed rotation.

Although certain preferred embodiments have been shown and described, it should be understood that many changes and modifications may be made thereto without departing from the scope of the appended claims.

What is claimed is:

1. A turbocharger for an internal combustion engine having engine cylinders, comprising:
    a turbine drivable by the exhaust energy of the internal combustion engine and having an inpeller;
    an air compressor coupled by a shaft to said impeller for charging air into the engine cylinders in response to rotation of said shaft;
    a motor-generator having a rotor with a substantially I-shaped cross section mounted on said shaft, and stator coils disposed around said rotor, said rotor having an axial length longer than the diameter of said rotor, a magnetic path in the direction of the diameter of said rotor, dummy fillers which fill a part other than the magnetic path of said rotor to define a circular cross-section with said rotor, said magnetic path being fixedly secured to said dummy fillers, and an axially elongate, ring-shaped, rare-earth metal magnet constructed as a portion of said shaft and having a magnetic reluctance in a first direction normal to an axis of said shaft smaller than a magnetic reluctance in a second direction normal to the first direction and to the axis of said shaft, and an outer periphery of which is wound with carbon fibers;
    disks made of a metal of high tensile strength for holding the opposite ends of said magnet, respectively; and
    control means for operating said motor-generator as a motor under first operating conditions of the internal combustion engine, and as a generator under second operating conditions of the internal combustion engine,
    and means for supplying said stator coils with armature current leading a no-lead induced electromotive force by 90°.

2. A turbocharger according to claim 1, wherein said motor-generator is driven as the motor when the internal combustion engine operates in at least a low-speed high-load range.

3. A turbocharger according to claim 1, wherein said motor-generator is driven as the generator when the internal combustion engine operates in a high-speed range.

4. A turbocharger according to claim 1, wherein said motor-generator is driven as the generator when the internal combustion engine operates in a low-load range.

5. A turbocharger for an internal combustion engine having engine cylinders, comprising:
- a turbine drivable by the exhaust energy of the internal combustion engine and having an impeller;
- an air compressor coupled by a shaft to said impeller for charging air into the engine cylinders in response to rotation of said shaft;
- a motor-generator having a rotor with a substantially I-shaped cross section mounted on said shaft, and stator coils disposed around said rotor, said rotor having an axial length longer than the diameter of said rotor, a magnetic path in the direction of the diameter of said rotor, dummy fillers which fill a part other than the magnetic path of said rotor to define a circular cross-section with said rotor, said magnetic path being fixedly secured to said dummy fillers, and an axially elongate, ring-shaped, rare-earth metal magnet constructed as a portion of said shaft and having a magnetic reluctance in a first direction normal to an axis of said shaft smaller than a magnetic reluctance in a second direction normal to the first direction and to the axis of said shaft, and an outer periphery of which is wound with carbon fibers; and
- disks made of a metal of high tensile strength for holding the opposite ends of said magnet, respectively,
- wherein the motor-generator is operable as a motor under first operating conditions of the internal combustion engine, and the motor generator is operable as a generator under second operating conditions of the internal combustion engine, and
- means for supplying said stator coils with armature current leading a no-lead induced electromotive by 90°.

6. A turbocharger according to claim 5, wherein said motor-generator is driven as the motor when the internal combustion engine operates in at least a low-speed high-load range.

7. A turbocharger according to claim 5, wherein said motor-generator is driven as the generator when the internal combustion engine operates in a high-speed range.

8. A turbocharger according to claim 5, wherein said motor-generator is driven as the generator when the internal combustion engine operates in a low-load range.

* * * * *

UNITED STATES PATENT AND TRADEMARK OFFICE
CERTIFICATE OF CORRECTION

PATENT NO. : 4,769,993
DATED : Sep. 13, 1988
INVENTOR(S) : Kawamura

It is certified that error appears in the above-identified patent and that said Letters Patent is hereby corrected as shown below:

Col. 7

Line 15, delete "$\alpha$ 32" and insert -- $\alpha$ --.

Signed and Sealed this

Thirty-first Day of January, 1989

Attest:

DONALD J. QUIGG

*Attesting Officer*     *Commissioner of Patents and Trademarks*